(12) United States Patent
Yang et al.

(10) Patent No.: US 11,827,990 B2
(45) Date of Patent: Nov. 28, 2023

(54) DUAL-MEMBRANE ON-LINE GENERATOR FOR ACID OR ALKALI SOLUTION

(71) Applicants: EAST CHINA UNIVERSITY OF SCIENCE AND TECHNOLOGY, Shanghai (CN); SHIMADZU (CHINA) CO., LTD., Shanghai (CN)

(72) Inventors: Bingcheng Yang, Shanghai (CN); Feifang Zhang, Shanghai (CN); Yifei Lu, Shanghai (CN); Liting Zhou, Shanghai (CN); Shujun Huang, Shanghai (CN)

(73) Assignees: EAST CHINA UNIVERSITY OF SCIENCE AND TECHNOLOGY, Shanghai (CN); SHIMADZU (CHINA) CO., LTD., Shanghai (CN)

( * ) Notice: Subject to any disclaimer, the term of this patent is extended or adjusted under 35 U.S.C. 154(b) by 438 days.

(21) Appl. No.: 15/734,689

(22) PCT Filed: Jun. 14, 2019

(86) PCT No.: PCT/CN2019/091199
§ 371 (c)(1),
(2) Date: Dec. 3, 2020

(87) PCT Pub. No.: WO2020/007180
PCT Pub. Date: Jan. 9, 2020

(65) Prior Publication Data
US 2021/0230756 A1 Jul. 29, 2021

(30) Foreign Application Priority Data
Jul. 5, 2018 (CN) .......................... 201810729722.9

(51) Int. Cl.
*C25B 9/23* (2021.01)
*C25B 1/16* (2006.01)
(Continued)

(52) U.S. Cl.
CPC .............. *C25B 9/23* (2021.01); *B01D 61/445* (2013.01); *B01D 61/46* (2013.01); *B01J 47/08* (2013.01);
(Continued)

(58) Field of Classification Search
CPC ............... B01D 61/44–54; C25B 1/16; G01N 30/26–468
See application file for complete search history.

(56) References Cited

U.S. PATENT DOCUMENTS 5,045,204 A * 9/1991 Dasgupta ........... B01D 19/0031
210/635
6,755,951 B1 * 6/2004 Mani ..................... B01D 61/52
204/531
(Continued)

FOREIGN PATENT DOCUMENTS

CN 101377477 A 3/2009
CN 201793755 U 4/2011
(Continued)

OTHER PUBLICATIONS

International Search Report dated Sep. 12, 2019 for corresponding PCT patent application No. PCT/CN2019/091199.

*Primary Examiner* — Luan V Van
*Assistant Examiner* — Andrew Koltonow
(74) *Attorney, Agent, or Firm* — AMSTER, ROTHSTEIN & EBENSTEIN LLP (57) ABSTRACT

A dual-membrane on-line generator for an acid or alkali solution is provided, including an upper electrolytic cell body (3), a middle electrolytic cell body (4) and a lower electrolytic cell body (5) which are clamped by an upper fastening steel plate (1) and a lower fastening steel plate (2), an upper regeneration liquid channel (A), a middle eluent
(Continued)

channel (B) and a lower regeneration liquid channel (C) being provided on the middle electrolytic cell body (4).

10 Claims, 3 Drawing Sheets

(51) Int. Cl.
*C25B 1/22* (2006.01)
*C25B 13/08* (2006.01)
*B01D 61/44* (2006.01)
*B01D 61/46* (2006.01)
*B01J 49/57* (2017.01)
*B01J 47/08* (2006.01)
*B01J 47/12* (2017.01)

(52) U.S. Cl.
CPC ............... *B01J 47/12* (2013.01); *B01J 49/57* (2017.01); *C25B 1/16* (2013.01); *C25B 1/22* (2013.01); *C25B 13/08* (2013.01)

(56) References Cited

U.S. PATENT DOCUMENTS

| | | | |
|---|---|---|---|
| 7,632,404 | B2 | 12/2009 | Dasgupta et al. |
| 2006/0231403 | A1* | 10/2006 | Riviello ............... B01D 61/48 |
| | | | 204/632 |
| 2009/0188798 | A1* | 7/2009 | Riviello ............... G01N 30/96 |
| | | | 204/632 |

FOREIGN PATENT DOCUMENTS

| | | |
|---|---|---|
| CN | 102234813 A | 11/2011 |
| CN | 103842053 A | 6/2014 |
| CN | 109136975 A | 1/2019 |
| CN | 109704444 A | 5/2019 |
| JP | 2015223566 A | 12/2015 |
| WO | 2017158493 A1 | 9/2017 |

\* cited by examiner

DUAL-MEMBRANE ON-LINE GENERATOR FOR ACID OR ALKALI SOLUTION

CROSS REFERENCE TO RELATED APPLICATIONS

This application is a national phase of PCT application No. PCT/CN2019/091199, filed Jun. 14, 2019, which claims priority to CN patent application No. 201810729722.9, filed Jul. 5, 2018, all of which are incorporated herein by reference thereto.

TECHNICAL FIELD

The present invention relates to the technical field of design and manufacture of analytical instruments and equipment, specifically to a dual-membrane on-line generator for an acid or alkali solution that implements directional migration of ions under a combined action of an electric field and an ion exchange membrane, and converts pure water into an acid or alkali solution of a set concentration.

BACKGROUND

High-purity alkali or high-purity acid solutions are commonly used solutions in analytical instruments, especially chromatographic instruments, and require extremely stringent purity. However, it is difficult to achieve manual preparation of high-purity alkali or high-purity acid solutions. The main reason is that the obtained solution contains many impurities. On one hand, the impurities come from the solution itself, and on the other hand, the solution absorbs some components from the air. Therefore, it is difficult to maintain high purity. Taking preparation of a high-purity alkali (KOH) solution as an example, it is not only time-consuming to manually prepare a high-purity alkali solution, but also it is difficult to accurately prepare a high-purity alkali solution of a required concentration. During the preparation, the high-purity alkali solution can easily absorb carbon dioxide from the air so that the solution is polluted, and $K_2CO_3$ is generated when the carbon dioxide is dissolved in the high-purity alkali solution. Preparation of a high-purity acid solution also has similar problems: metal impurities are prone to exist in the high-purity acid solution, and ammonia of a little amount in the air is easily absorbed and converted into ammonium ions, thereby polluting the high-purity acid solution. Currently, an electrodialytic eluent generator of an electrodialysis principle is mainly used to solve the above problems.

According to different polarities of ion exchange membranes, the electrodialytic eluent generator can be roughly divided into two types: single-membrane and dual-membrane. In the single-membrane structure, a single-polarity ion exchange membrane is used to isolate an eluent channel from a regeneration liquid channel. In this structure, there is only one regeneration liquid channel; the single-polarity ion exchange membrane refers to a cation exchange membrane (anion type) or an anion exchange membrane (cation type), and ion exchange membranes of the same polarity can be stacked in multiple layers. In the single-membrane structure, one electrode is directly placed in the eluent channel, and the other electrode is placed in the regeneration liquid channel. During a working process of the single-membrane electrodialytic eluent generator, the electrode placed in the eluent channel will generate electrolytic gas proportional to an applied current. To avoid interference of the electrolytic gas on a downstream analysis system, a special degasser is used to remove the electrolysis gas at present. The vast majority of electrodialytic eluent generators reported by existing literatures and all current commercial electrodialytic eluent generators are of single-membrane structures.

In the dual-membrane structure, ion exchange membranes of two different polarities are used to respectively isolate an eluent channel from regeneration liquid channels. In this structure, there are two regeneration liquid channels, which are located on both sides of the eluent channel. The "two different polarities" means that both a cation exchange membrane (anion type) and an anion exchange membrane (cation type) are used at the same time. In the ion exchange membranes of "two different polarities", ion exchange membranes of the same polarity can be stacked in multiple layers. In the dual-membrane structure, anode and cathode electrodes are respectively arranged in the regeneration liquid channels and do not directly contact the eluent channel. It is precisely because the cathode and anode electrodes are not in contact with the eluent channel, electrolytic gas generated when the electrodialytic eluent generator works does not enter the eluent channel, and therefore no interference on the downstream analysis system is caused. However, the anion exchange membrane used in the electrodialytic eluent generator of a dual-membrane structure has an inherent defect of unstable performance in an alkali solution located in a cathode zone, so it is impossible to obtain high-purity alkali or high-purity acid solution. For example, Dasgupta et al. reported "an electrodialytic eluent generator of a dual-membrane structure constructed with a cation exchange membrane and an anion exchange membrane" (Anal. Chem. 1991, 63, 480-486). The report specifically emphasized that the generated high-purity alkali solution is impure, and the device has limited pressure resistance, cannot withstand a pressure from a chromatographic system and can only be used in low-pressure systems. The Chinese patent (CN101377477A) discloses "a similar dual-membrane automatic eluent generator", in which a cation exchange membrane and an anion exchange membrane are used to isolate a middle eluent channel from regeneration liquid channels on both sides. In the dual-membrane eluent generator, because the anion membrane is in contact with the alkali solution, there is still a defect that eluent generated is impure in principle. The United States patent (U.S. Pat. No. 7,632,404) discloses "a dual-membrane electrodialytic eluent generator for a capillary system constructed by using an anion exchange resin and a cation exchange resin to replace the anion and cation membranes." However, a concentration range of the acid or alkali solution that can be generated by the electrodialytic eluent generator is very limited, and an applicable flow rate range is in the order of μL/min, and the generator can only be applied to a capillary separation system.

Now there is a kind of "bipolar membrane", which is an ion exchange membrane with a special ion structure made of a composite of a cation membrane and an anion membrane. Under the action of a direct current electric field, $H_2O$ between the anion membrane composite layer and the cation membrane composite layer is easily dissociated into $H^+$ and $OH^-$, which respectively enter a cathode area and an anode area through the cation membrane and the anion membrane. Because $H^+$ and $OH^-$ can be provided at the same time, the "bipolar membrane", as a polarity switching membrane, is combined with an anion exchange membrane and a cation exchange membrane to form three membranes of different polarities. That is, the bipolar membrane is placed between the cation exchange membrane and the anion exchange membrane by using an isolation net to form a membrane stack electrodialysis device, which is widely used in fields such as seawater desalination, chemical purification, organic acid preparation, and wastewater treatment. However, the anion exchange membrane used in the membrane stack is in direct contact with the cathode area, and still has the problem of instability in a strong alkali solution. Therefore, an inorganic salt solution is often used in industry to replace the strong alkali solution to avoid this defect. In addition, the membrane stack electrodialysis device composed of the bipolar membrane and the anion and cation exchange membranes can only work in a low-pressure environment, and this is because the bipolar membrane is used independently, there are liquid channels between the bipolar membrane and the anion exchange membrane and the cation exchange membrane, and the strength and pressure resistance of the bipolar membrane are very limited (such as less than 0.5 MPa); therefore, the formed membrane stack cannot withstand a pressure from a typical chromatography system (required to withstand a system pressure of more than 20 MPa), and application of the bipolar membrane in the chromatography system has not been reported.

SUMMARY

An objective of the present invention is to solve shortcomings of the prior art and provide a dual-membrane on-line generator for an acid or alkali solution, which adopts a sandwich structure of a cation exchange membrane+a bipolar membrane–a middle channel–a cation exchange membrane to generate an alkali solution; or adopts a sandwich structure of an anion exchange membrane+a bipolar membrane–a middle channel–an anion exchange membrane to generate an acid solution. In the present invention, there are only a cation exchange membrane and a bipolar membrane or only an anion exchange membrane and a bipolar membrane.

The dual-membrane on-line generator for an acid or alkali solution of the present invention implements directional migration of ions, and converts pure water into an acid or alkali solution of a set concentration (the set concentration is related to an applied current) under a combined action of an electric field and an ion exchange membrane. Specifically, a middle eluent channel is isolated from an upper regeneration liquid channel and a lower regeneration liquid channel by using a cation exchange membrane+a bipolar membrane–a cation exchange membrane, and this structure is used to generate an alkali solution. Alternatively, a middle eluent channel is isolated from an upper regeneration liquid channel and a lower regeneration liquid channel by using an anion exchange membrane+a bipolar membrane–an anion exchange membrane, and this structure is used to generate an acid solution. Electrodes are arranged in the regeneration liquid channels on both sides and are completely isolated from the middle channel in space. Regeneration liquids are respectively located in a cathode area and an anode area. Under the action of the electric field, electrolyte ions are electromigrated from the cathode area and the anode area to the middle eluent channel, the acid or alkali solution of a certain concentration is obtained online, and the concentration of the acid or alkali solution is proportional to the applied current.

To achieve the above objective, the present invention adopts the following technical solution.

A dual-membrane on-line generator for an acid or alkali solution is provided. In this solution, an on-line generator for an alkali solution is provided, including an upper fastening steel plate, a lower fastening steel plate, an upper electrolytic cell body, a middle electrolytic cell body and a lower electrolytic cell body, the upper electrolytic cell body, the middle electrolytic cell body and the lower electrolytic cell body are clamped in sequence by the upper fastening steel plate and the lower fastening steel plate, and upper and lower corners of the upper fastening steel plate and the lower fastening steel plate are fastened with fastening screws; an upper regeneration liquid channel, a middle eluent channel and a lower regeneration liquid channel are arranged on the middle electrolytic cell body; two openings are provided on both sides of the upper regeneration liquid channel, and are respectively used as an upper regeneration liquid channel inlet and an upper regeneration liquid channel outlet, and openings of the upper regeneration liquid channel inlet and the upper regeneration liquid channel outlet are respectively arranged on the upper fastening steel plate, a cathode electrode (corresponding to the anode electrode) is arranged in the upper regeneration liquid channel, and the other end of the cathode electrode is arranged on the upper fastening steel plate (note: in the on-line generator for an acid solution, an anode electrode is arranged herein); the middle eluent channel is a hollow channel, two openings are provided on both sides of the middle eluent channel, and are respectively used as a middle eluent channel inlet and a middle eluent channel outlet, and openings of the middle eluent channel inlet and the middle eluent channel outlet are respectively arranged on both sides of the middle electrolytic cell body; two openings are provided on both sides of in the lower regeneration liquid channel, and are respectively used as a lower regeneration liquid channel inlet and a lower regeneration liquid channel outlet, and openings of the lower regeneration liquid channel inlet and the lower regeneration liquid channel outlet are respectively arranged on the lower fastening steel plate, an anode electrode (corresponding to the cathode electrode) is arranged in the lower regeneration liquid channel, and the other end of the anode electrode is arranged on the lower fastening steel plate (note: in the on-line generator for an acid solution, a cathode electrode is arranged herein); a porous cathode sheet, a first cation exchange membrane and a bipolar membrane are provided between the upper regeneration liquid channel and the middle eluent channel (layer by layer from the outside to the inside); a porous anode sheet and a second cation exchange membrane are provided between the middle eluent channel and the lower regeneration liquid channel (layer by layer from the outside to the inside) (note: in the on-line generator for an acid solution, a porous cathode sheet and a second anion exchange membrane are arranged herein); upstream pure water enters through the middle eluent channel inlet, and flows out from the middle eluent channel outlet after passing through the middle eluent channel; pure alkali (KOH) regeneration liquid enters through the upper regeneration liquid channel inlet, and flows out from the upper regeneration liquid channel outlet after passing through the upper regeneration liquid channel, and then enters through the lower regeneration liquid channel inlet, flows out from the lower regeneration liquid channel outlet after passing through the lower regeneration liquid channel, and flows back to regeneration liquid.

Further, the middle eluent channel is filled with ion exchange screens or inert particles with a wide pH working range or monolithic columns or fibers.

Further, multi-layer and overlapping first cation exchange membranes and bipolar membranes are provided between the upper regeneration liquid channel and the middle eluent channel (layer by layer from the outside to the inside).

Further, multi-layer and overlapping second cation exchange membranes are provided between the middle eluent channel and the lower regeneration liquid channel (layer by layer from the outside to the inside).

Further, the first cation exchange membrane, the second cation exchange membrane and the bipolar membrane are in form of ion exchange plate membranes.

Further, the cathode electrode and the anode electrode adopt a porous platinum electrode structure.

A dual-membrane on-line generator for an acid or alkali solution is provided. In this solution, an on-line generator for an acid solution is provided, including an upper fastening steel plate, a lower fastening steel plate, an upper electrolytic cell body, a middle electrolytic cell body and a lower electrolytic cell body, where the upper electrolytic cell body, the middle electrolytic cell body and the lower electrolytic cell body are clamped in sequence by the upper fastening steel plate and the lower fastening steel plate, and upper and lower corners of the upper fastening steel plate and the lower fastening steel plate are fastened with fastening screws; an upper regeneration liquid channel, a middle eluent channel and a lower regeneration liquid channel are arranged on the middle electrolytic cell body; two openings are provided on both sides of the upper regeneration liquid channel, and are respectively used as an upper regeneration liquid channel inlet and an upper regeneration liquid channel outlet, and openings of the upper regeneration liquid channel inlet and the upper regeneration liquid channel outlet are respectively arranged on the upper fastening steel plate, a anode electrode (corresponding to the cathode electrode) is arranged in the upper regeneration liquid channel, the anode electrode adopts a porous platinum electrode structure, and the other end of which is arranged on the upper fastening steel plate; the middle eluent channel is a hollow channel, two openings are provided on both sides of the middle eluent channel, and are respectively used as a middle eluent channel inlet and a middle eluent channel outlet, and openings of the middle eluent channel inlet and the middle eluent channel outlet are respectively arranged on both sides of the middle electrolytic cell body; two openings are provided on both sides of in the lower regeneration liquid channel, and are respectively used as the lower regeneration liquid channel inlet and the lower regeneration liquid channel outlet, and openings of the lower regeneration liquid channel inlet and the lower regeneration liquid channel outlet are respectively arranged on the lower fastening steel plate, an cathode electrode (corresponding to the anode electrode) is arranged in the lower regeneration liquid channel, the cathode electrode adopts a porous platinum electrode structure, and the other end of which is arranged on the lower fastening steel plate; a porous anode sheet, a first anion exchange membrane and a bipolar membrane are provided between the upper regeneration liquid channel and the middle eluent channel (layer by layer from the outside to the inside); a porous cathode sheet and a second anion exchange membrane are provided between the middle eluent channel and the lower regeneration liquid channel (layer by layer from the outside to the inside); upstream pure water enters through the middle eluent channel inlet, and flows out from the middle eluent channel outlet after passing through the middle eluent channel; pure acid regeneration solution enters through the upper regeneration liquid channel inlet, and flows out from the upper regeneration liquid channel outlet after passing through the upper regeneration liquid channel, and then enters through the lower regeneration liquid channel inlet, flows out from the lower regeneration liquid channel outlet after passing through the lower regeneration liquid channel, and flows back to regeneration liquid.

Further, the middle eluent channel is filled with ion exchange screens or inert particles with a wide pH working range or monolithic columns or fibers.

Further, multi-layer and overlapping first anion exchange membranes and bipolar membranes are provided between the upper regeneration liquid channel and the middle eluent channel (layer by layer from the outside to the inside).

Further, multi-layer and overlapping second anion exchange membranes are provided between the middle eluent channel and the lower regeneration liquid channel (layer by layer from the outside to the inside).

Positive effects of the dual-membrane on-line generator for an acid or alkali solution of the present invention are as follows:

(1) The present invention adopts a structure similar to a dual-membrane structure, but is different from the conventional dual-membrane in the selection of membrane. A cation exchange membrane+a bipolar membrane (note: the cation exchange membrane is in direct contact with the bipolar membrane, and there is no isolation net therebetween), and a cation exchange membrane are used to generate an alkali solution, that is: a structure with a cation exchange membrane+a bipolar membrane–a middle channel–a cation exchange membrane; or, an anion exchange membrane+a bipolar membrane (note: the anion exchange membrane is in direct contact with the bipolar membrane, and there is no separation net therebetween), and the anion exchange membrane are used to generate an acid solution, that is: a structure with an anion exchange membrane+a bipolar membrane–intermediate channel–an anion exchange membrane.

(2) After a current is applied by the porous platinum electrode, electrolytic gas only exists in the two regeneration liquid channels (the upper regeneration liquid channel and the lower regeneration liquid channel) and does not enter the middle eluent channel. This structure ensures that the eluent generated in the eluent channel does not contain electrolytic gas, and a degassing device can be omitted. Thus, purity of the generated solution is ensured, and stability of the operation of the dual-membrane eluent generator is improved.

(3) The dual-membrane on-line generator for an acid or alkali solution of the present invention can be used for online preparation of high-purity acid or high-purity alkali solutions in the fields of liquid chromatography and ion chromatography.

Reference signs in the figures are as follows:
A. Upper regeneration liquid channel;
B. Middle eluent channel;
C. Lower regeneration liquid channel;
1. Upper fastening steel plate;
2. Lower fastening steel plate;
3. Upper electrolytic cell body;
4. Middle electrolytic cell body;
5. Lower electrolytic cell body;
6. Porous cathode sheet;
701. First cation exchange membrane;
702. Second cation exchange membrane;
703. First anion exchange membrane;
704. Second anion exchange membrane;
8. Bipolar membrane
9. Ion exchange screen;
10. Porous anode sheet;
11. Fastening screw;
12. Cathode electrode;
13. Anode electrode;
14. Upper regeneration liquid channel inlet;
15. Upper regeneration liquid channel outlet;
16. Middle eluent channel inlet;
17. Middle eluent channel outlet;
18. Lower regeneration liquid channel inlet;
19. Lower regeneration liquid channel outlet.

DETAILED DESCRIPTION OF EMBODIMENTS

The specific embodiments of the dual-membrane on-line generator for an acid or alkali solution of the present invention are explained in detail below with reference to the accompanying drawings. It should be noted that the embodiments of the present invention is not limited to the following embodiments. In addition, the experimental methods used in the embodiments are conventional methods unless otherwise specified. Similarly, the materials, structures, reagents, etc. used in the embodiments are all commercially available unless otherwise specified.

Embodiment 1

Figure 1:
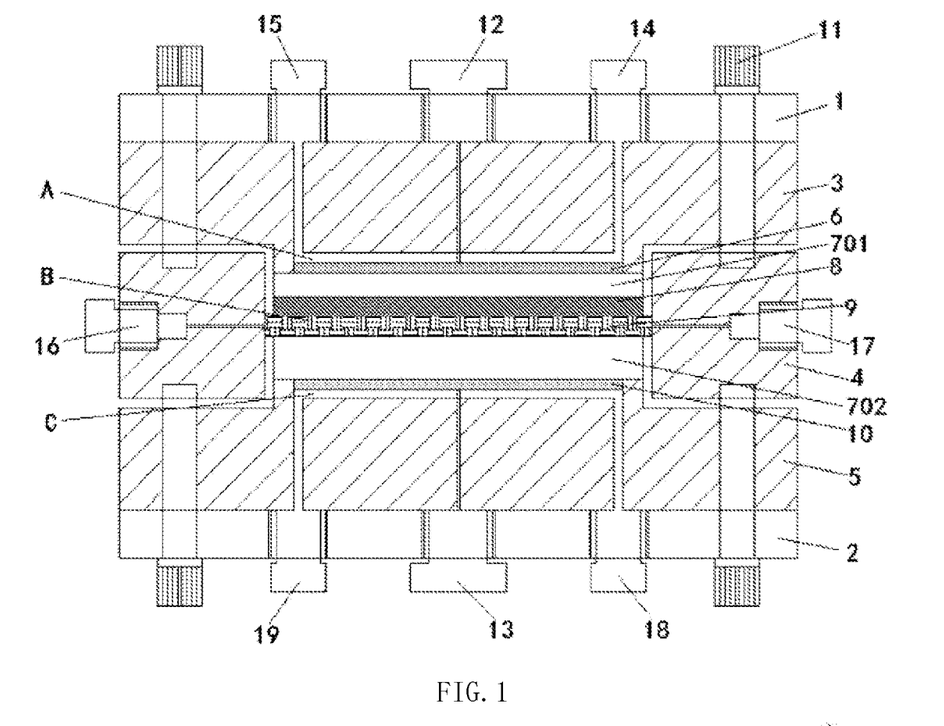
FIG. 1 is a schematic structural diagram of a dual-membrane on-line generator for an acid or alkali solution of Embodiment 1 of the present invention.

Referring to FIG. 1, a dual-membrane on-line generator for an acid or alkali solution is provided. In this solution, an on-line generator for an alkali solution is provided, including: an upper fastening steel plate 1, a lower fastening steel plate 2, an upper electrolytic cell body 3, a middle electrolytic cell body 4, and a lower electrolytic cell body 5. The upper electrolytic cell body 3, the middle electrolytic cell body 4, and the lower electrolytic cell body 5 are clamped in sequence by the upper fastening steel plate 1 and the lower fastening steel plate 2, and upper and lower corners of the upper fastening steel plate 1 and the lower fastening steel plate 2 are fastened with fastening screws 11. This is a connection form of an overall structure. However, the following operations need to be done prior to this.

The middle electrolytic cell body 4 is provided with an upper regeneration liquid channel A, a middle eluent channel B, and a lower regeneration liquid channel C. Two openings are provided on both sides of the upper regeneration liquid channel A, and are respectively used as an upper regeneration liquid channel inlet 14 and an upper regeneration liquid channel outlet 15. Openings of the upper regeneration liquid channel inlet 14 and the upper regeneration liquid channel outlet 15 can be respectively arranged on both sides of the upper fastening steel plate 1. Then, a cathode electrode 12 (corresponding to the anode electrode 13) is arranged in the upper regeneration liquid channel A, and the cathode electrode 12 may adopt a porous platinum electrode structure. One end of the cathode electrode 12 may be arranged in the middle of the upper fastening steel plate 1.

The middle eluent channel B can be a hollow channel, or the middle eluent channel B is filled with ion exchange screens 9 or inert particles with a wide pH working range or monolithic columns or fibers. Two openings are provided on both sides of the middle eluent channel B, and are respectively used as a middle eluent channel inlet 16 and a middle eluent channel outlet 17. Openings of the middle eluent channel inlet 16 and the middle eluent channel outlet 17 can be respectively arranged on both sides of the middle electrolytic cell body 4. In specific implementation, the middle eluent channel inlet 16 can be arranged on a left side of the middle electrolytic cell body 4, and the middle eluent channel outlet 17 is arranged on a right side of the middle electrolytic cell body 4 (shown based on an orientation of FIG. 1).

Two openings are provided on both sides of the lower regeneration liquid channel C, and are respectively used as a lower regeneration liquid channel inlet 18 and a lower regeneration liquid channel outlet 19. Openings of the lower regeneration liquid channel inlet 18 and the lower regeneration liquid channel outlet 19 are respectively provided on both sides of the lower fastening steel plate 2. Then, an anode electrode 13 (corresponding to the cathode electrode 12) is provided in the lower regeneration liquid channel C, and the anode electrode 13 adopts a porous platinum electrode structure. One end of the anode electrode 13 may be arranged in the middle of the lower fastening steel plate 2.

A porous cathode sheet 6, a first cation exchange membrane 701 and a bipolar membrane 8 are arranged layer by layer from the outside to the inside (shown based on the orientation of FIG. 1) between the upper regeneration liquid channel A and the middle eluent channel B.

A porous anode sheet 10 and a second cation exchange membrane 702 are arranged layer by layer from the outside to the inside (shown based on the orientation of FIG. 1) between the middle eluent channel B and the lower regeneration liquid channel C.

The first cation exchange membrane 701, the second cation exchange membrane 702, and the bipolar membrane 8 used in the embodiments of the present invention are all in form of ion exchange plate membranes.

The dual-membrane on-line generator for an alkali solution of Embodiment 1 is assembled according to the above steps and FIG. 1, and the middle eluent channel B and the two regeneration liquid channels (the upper regeneration liquid channel A and the lower regeneration liquid channel C) are independent from each other. This structure is used, so that the dual-membrane on-line generator for an alkali solution of Embodiment 1 does not generate eluent containing electrolytic gas. In this way, a concentration of an alkali solution is proportional to an applied current, and stability and repeatability are good.

Figure 2:
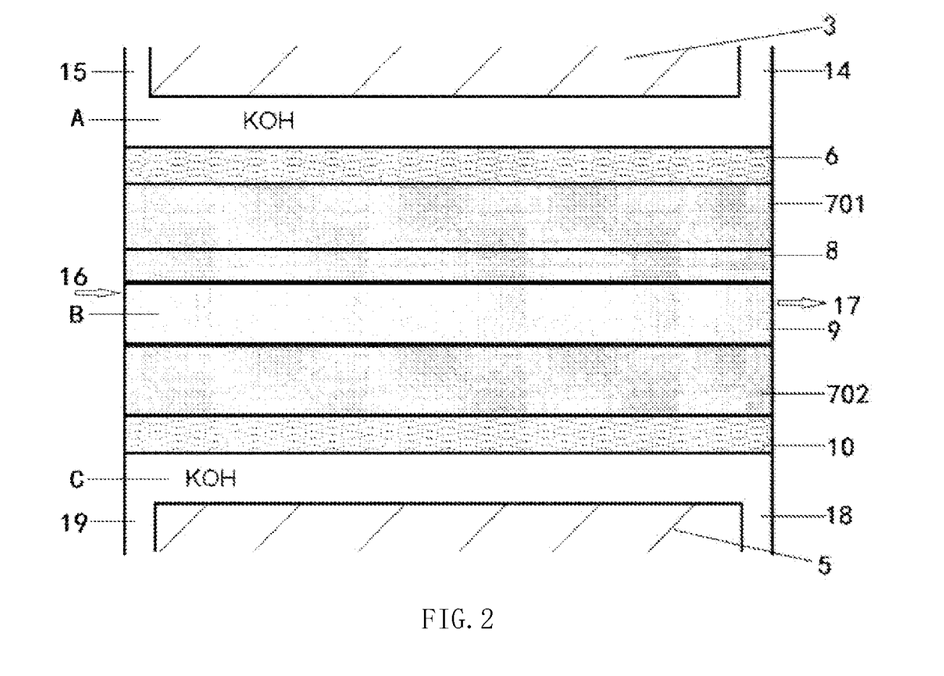
FIG. 2 is a schematic diagram of a working principle of a dual-membrane on-line generator for an acid or alkali solution of Embodiment 1 of the present invention.

A working mode of the dual-membrane on-line generator for an alkali solution of Embodiment 1 is (see FIG. 2) as follows: Upstream pure water enters through the middle eluent channel inlet 16, and flows out from the middle eluent channel outlet 17 after passing through the middle eluent channel B. Pure alkali (KOH) regeneration liquid enters through the upper regeneration liquid channel inlet 14, and flows out from the upper regeneration liquid channel outlet 15 after passing through the upper regeneration liquid channel A, and then enters through the lower regeneration liquid channel inlet 18, flows out from the lower regeneration liquid channel outlet 19 after passing through the lower regeneration liquid channel C, and flows back into regeneration liquid. The dual-membrane on-line generator for an alkali solution of Embodiment 1 utilizes spatial isolation of the bipolar membrane 8 from the electric field and the alkali solution, so that insufficient purity of the alkali solution due to insufficient stability thereof is avoided.

Figure 3:
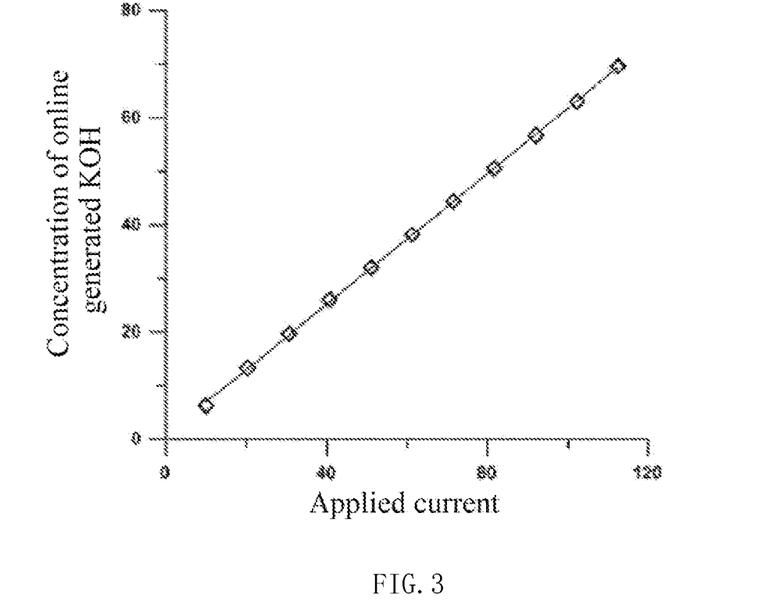
FIG. 3 shows a correlation between a current and a concentration of KOH generated by a dual-membrane on-line generator for an alkali solution of Embodiment 1 of the present invention.

The correlation between the current and the alkali solution generated by the dual-membrane on-line generator for an alkali solution of Embodiment 1 is shown in FIG. 3. The dual-membrane on-line generator for an alkali solution of Embodiment 1 can online converts the pure water entering the eluent from the middle eluent channel inlet 16 into a KOH solution, and a concentration of the generated KOH solution is positively correlated with the current applied to the porous cathode sheet 6 and the porous anode sheet 10. It can be learned from FIG. 3 that the concentration of the generated KOH solution is linearly correlated with the applied current. Therefore, the concentration of the generated alkali solution can be conveniently controlled by controlling the current.

Embodiment 2

A dual-membrane on-line generator for an acid or alkali solution is provided, and a structure of the generator is basically the same as that in Embodiment 1. Differences are as follows:

Multi-layer and overlapping first cation exchange membranes 701 and bipolar membranes 8 are arranged layer by layer from the outside to the inside (shown based on the orientation of FIG. 1) between the upper regeneration liquid channel A and the middle eluent channel B.

Multi-layer and overlapping second cation exchange membranes 702 are arranged layer by layer from the outside to the inside (shown based on the orientation of FIG. 1) between the middle eluent channel B and the lower regeneration liquid channel C.

Embodiment 3

Figure 4:
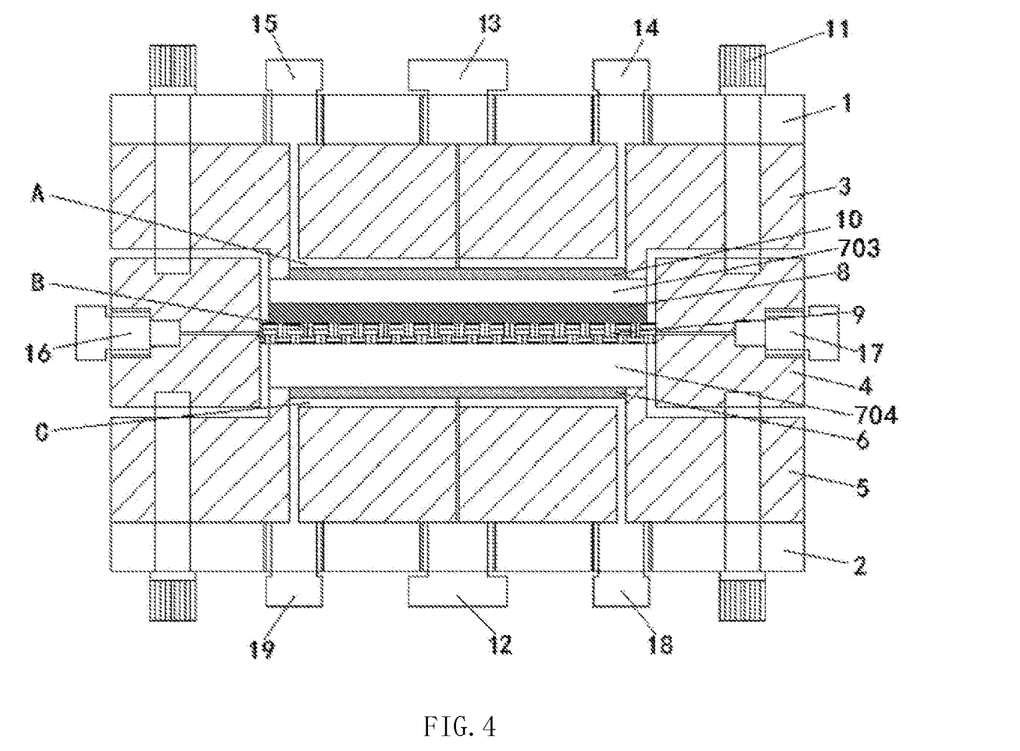
FIG. 4 is a schematic structural diagram of a dual-membrane on-line generator for an acid or alkali solution of Embodiment 3 of the present invention.

Referring to FIG. 4, a dual-membrane on-line generator for an acid or alkali solution is provided. In this solution, an on-line generator for an acid solution is provided, and a structure of the generator is basically the same as that in Embodiment 1. Differences are as follows: A porous anode sheet 10, a first anion exchange membrane 703, and a bipolar membrane 8 are arranged layer by layer from the outside to the inside (shown based on an orientation of FIG. 4) between the upper regeneration liquid channel A and the middle eluent channel B.

A porous cathode sheet 6 and a second anion exchange membrane 704 are arranged layer by layer from the outside to the inside (shown based on the orientation of FIG. 4) between the middle eluent channel B and the lower regeneration liquid channel C.

An anode electrode 13 (corresponding to the cathode electrode 12) is provided in the upper regeneration liquid channel A. A cathode electrode 12 (corresponding to the anode electrode 13) is provided in the lower regeneration liquid channel C.

Upstream pure water enters through the middle eluent channel inlet 16, and flows out from the middle eluent channel outlet 17 after passing through the middle eluent channel B. Pure acid regeneration liquid enters through the upper regeneration liquid channel inlet 14, and flows out from the upper regeneration liquid channel outlet 15 after passing through the upper regeneration liquid channel A, and then enters through the lower regeneration liquid channel inlet 18, flows out from the lower regeneration liquid channel outlet 19 after passing through the lower regeneration liquid channel C, and flows back to regeneration liquid.

The dual-membrane on-line generator for an acid solution of Embodiment 3 is assembled according to the steps of Embodiment 3 and FIG. 4, and the middle eluent channel B and the two regeneration liquid channels (the upper regeneration liquid channel A and the lower regeneration liquid channel C) are independent from each other. This structure is used, so that the dual-membrane on-line generator for an acid solution of Embodiment 3 does not generate eluent containing electrolytic gas. In this way, a concentration of the acid solution is proportional to an applied current, and stability and repeatability are good.

Figure 5:
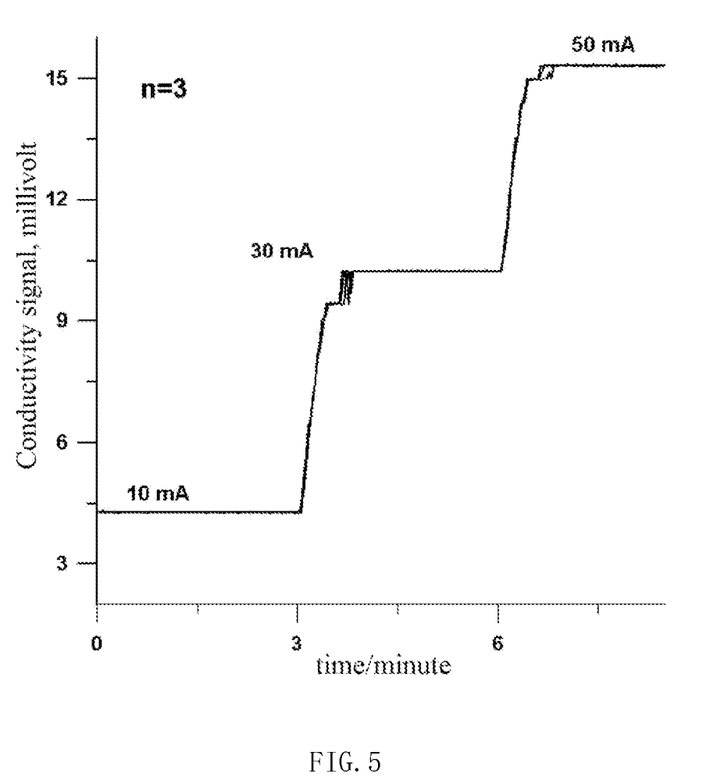
FIG. 5 is a schematic diagram of operation repeatability for acid generation of a dual-membrane on-line generator for an acid solution of Embodiment 3 of the present invention.

For the repeatability of generating an acid solution generated online by the dual-membrane on-line generator for an acid solution in Embodiment 3, refer to FIG. 5: A flow rate of pure water entering through the inlet 16 is controlled, and a current can be changed to obtain current-related acid solutions of different concentrations from the middle eluent channel outlet 17. Online measurement can be performed on the concentration of the acid solution by using a commercial conductivity detector (the conductivity detector can be purchased directly from commercial channels, does not belong to the scope of protection of the present invention, and is only used to indirectly evaluate the performance of the present invention, and therefore is not directly drawn herein). If different currents are applied between the porous cathode sheet 6 and the porous anode sheet 10, for example: 10 mA, 30 mA, and 50 mA, the acid solutions generated under different currents generate different signal values on the conductivity detector, but the signal values are almost the same under the same current. It can be learned from FIG. 5 that electrical conductivity detection values of the acid solution obtained by repeating the above current for three times are very consistent, and it indicates that the operation of the dual-membrane on-line generator for an acid solution of Embodiment 3 has good repeatability.

Embodiment 4

A dual-membrane on-line generator for an acid or alkali solution is provided, and a structure of the generator is basically the same as that in Embodiment 3. Differences are as follows:

Multi-layer and overlapping first anion exchange membranes 703 and bipolar membranes 8 are arranged layer by layer from the outside to the inside (shown based on the orientation of FIG. 4) between the upper regeneration liquid channel A and the middle eluent channel B.

Multi-layer and overlapping second anion exchange membranes 704 are arranged layer by layer from the outside to the inside (shown based on an orientation of FIG. 1) between the middle eluent channel B and the lower regeneration liquid channel C.

The above description is only the preferred embodiments of the present invention. It should be pointed out that for the person skilled in the art, several improvements and modifications can be made without departing from the principle and structure of the present invention. These improvements and modifications should also be regarded as the protection scope of the present invention.

The invention claimed is:
1. A dual-membrane on-line generator for generating an acid or alkali solution comprising:
an upper fastening steel plate and a lower fastening steel plate,
an upper electrolytic cell body,
a middle electrolytic cell body and a
lower electrolytic cell body,
the upper electrolytic cell body, the middle electrolytic cell body and the lower electrolytic cell body being releasably secured in fluid-tight relation between the upper fastening steel plate and the lower fastening steel plate,
wherein the middle electrolytic cell body is provided with an upper regeneration liquid channel (A), a middle eluent channel (B) and a lower regeneration liquid channel (C),
the upper regeneration liquid channel having an inlet at one end and an outlet, at its opposite end, the upper regeneration liquid channel (A) inlet and the upper regeneration liquid channel outlet being arranged in the upper fastening steel plate;
a cathode electrode having one end positioned in the upper regeneration liquid channel (A), and the opposite end arranged on the upper fastening steel plate;
the middle eluent channel (B) having an inlet at one end and an outlet at the opposite end, the inlet and outlet being arranged on opposite sides of the middle electrolytic cell body;
the lower regeneration liquid channel (C) having a lower regeneration liquid channel inlet at one end and a lower regeneration liquid channel outlet at the opposite end, the lower regeneration liquid channel inlet and the lower regeneration liquid channel outlet being arranged in the lower fastening steel plate;
an anode electrode having one end positioned in the lower regeneration liquid channel (C), and the opposite end arranged on the lower fastening steel plate;
a porous cathode sheet, a first cation exchange membrane and a bipolar membrane operatively positioned between the upper regeneration liquid channel (A) and the middle eluent channel (B);
a porous anode sheet and a second cation exchange membrane operatively positioned between the middle eluent channel (B) and the lower regeneration liquid channel (C);
whereby pure water entering the generator via the middle eluent channel inlet, passes through the middle eluent channel (B) and flows out of the middle eluent channel outlet,
pure alkali regeneration liquid entering the upper regeneration liquid channel inlet passes through the upper regeneration liquid channel (A) and flows out of the upper regeneration liquid channel outlet and enters the lower regeneration liquid channel inlet, passes through the lower regeneration liquid channel (C) and out of the lower regeneration liquid channel outlet to for recovery as regeneration liquid.

2. The dual-membrane on-line generator for generating an acid or alkali solution according to claim 1, wherein the middle eluent channel (B) is filled with ion exchange screens or inert particles, or with monolithic columns or fibers.

3. The dual-membrane on-line generator for generating an acid or alkali solution according to claim 1, wherein multi-layer and overlapping first cation exchange membranes and bipolar membranes are operatively positioned between the upper regeneration liquid channel (A) and the middle eluent channel (B).

4. The dual-membrane on-line generator for generating an acid or alkali solution according to claim 1, wherein multi-layer and overlapping second cation exchange membranes are operatively positioned between the middle eluent channel (B) and the lower regeneration liquid channel (C).

5. The dual-membrane on-line generator for generating an acid or alkali solution according to claim 3, wherein the first cation exchange membrane, the second cation exchange membrane and the bipolar membrane are in the form of ion exchange plate membranes.

6. The dual-membrane on-line generator for generating an acid or alkali solution according to claim 1, wherein the cathode electrode and the anode electrode are in the form of porous platinum electrode structures.

7. A dual-membrane on-line generator for generating an acid or alkali solution comprising:
an upper fastening steel plate and a lower fastening steel plate,
an upper electrolytic cell body,
a middle electrolytic cell body
and a lower electrolytic cell body
the upper electrolytic cell body, the middle electrolytic cell body and the lower electrolytic cell body being releasably secured in fluid-tight relation between the upper fastening steel plate and the lower fastening steel plate;
wherein, the middle electrolytic cell body is provided with an upper regeneration liquid channel (A), a middle eluent channel (B) and a lower regeneration liquid channel (C), the upper regeneration liquid channel (A) having an inlet at one end and and an upper regeneration liquid channel outlet at its opposite end, the upper regeneration liquid channel inlet and the upper regeneration liquid channel outlet being arranged in the upper fastening steel plate;
an anode electrode having one end positioned in the upper regeneration liquid channel (A) and its opposite end arranged on the upper fastening steel plate, the anode electrode having a porous platinum electrode structure,
the middle eluent channel (B) having an inlet at one end and an outlet at its opposite end the middle eluent channel inlet and the middle eluent channel outlet being arranged on opposite sides of the middle electrolytic cell body;
the lower regeneration liquid channel (C), having a lower regeneration liquid channel inlet at one end and lower regeneration liquid channel outlet at its opposite end, the lower regeneration liquid channel inlet and lower regeneration liquid channel outlet being arranged in the lower fastening steel plate;
a cathode electrode having one end positioned in the lower regenerating liquid channel and its opposite end arranged on the lower fastening steel plate, the cathode electrode having a porous platinum electrode structure;
a porous anode sheet, a first anion exchange membrane and a bipolar membrane operatively positioned between the upper regeneration liquid channel (A) and the middle eluent channel (B); and
a porous cathode sheet and a second anion exchange membrane operatively positioned between the middle eluent channel (B) and the lower regeneration liquid channel (C);

whereby pure water entering the middle eluent channel inlet flows out of the middle eluent channel outlet after passing through the middle eluent channel (B), pure acid regeneration liquid entering through the upper regeneration liquid channel inlet, and flows out of the upper regeneration liquid channel outlet after passing through the upper regeneration liquid channel (A) and enters the lower regeneration liquid channel inlet, passes through the lower regeneration liquid channel (C), flows out of the lower regeneration liquid channel outlet and is recovered as regeneration liquid.

8. The dual-membrane on-line generator for generating an acid or alkali solution according to claim 7, wherein the middle eluent channel (B) contains ion exchange screens or inert particles with a wide pH working range, or contains monolithic columns or fibers.

9. The dual-membrane on-line generator for generating an acid or alkali solution according to claim 7, wherein multi-layer and overlapping first anion exchange membranes and bipolar membranes are operatively positioned between the upper regeneration liquid channel (A) and the middle eluent channel (B).

10. The dual-membrane on-line generator for generating an acid or alkali solution according to claim 7, wherein multi-layer and overlapping second anion exchange membranes (704) are operatively positioned between the middle eluent channel (B) and the lower regeneration liquid channel (C).

\* \* \* \* \*